United States Patent [19]

Merkle

[11] 4,346,931
[45] Aug. 31, 1982

[54] BIFOLD VEHICLE DOOR ASSEMBLY
[75] Inventor: Ralph H. Merkle, Brighton, Mich.
[73] Assignee: General Motors Corporation, Detroit, Mich.
[21] Appl. No.: 206,139
[22] Filed: Nov. 12, 1980
[51] Int. Cl.[3] .............................................. B60J 5/06
[52] U.S. Cl. .................................... 296/148; 160/118; 160/188; 160/199; 160/206; 160/213; 49/340
[58] Field of Search ............... 160/213, 118, 206, 199, 160/117, 188; 49/340; 296/146, 178

[56] References Cited
U.S. PATENT DOCUMENTS

| | | | |
|---|---|---|---|
| 679,822 | 8/1901 | Bahrenburg | 49/371 |
| 1,977,284 | 10/1934 | Mathauer | 296/146 |
| 2,198,572 | 4/1940 | Cross | 160/213 |
| 2,249,273 | 7/1941 | Flogaus | 296/146 |
| 3,131,923 | 5/1964 | Clasen et al. | 49/81 |
| 4,164,189 | 8/1979 | Fritz et al. | 160/213 |

*Primary Examiner*—Robert R. Song
*Attorney, Agent, or Firm*—Patrick M. Griffin

[57] ABSTRACT

A bifold door assembly for an access port in a vehicle having a non-linear side wall. The assembly includes a pair of bifold doors, each having a planar outer panel disposed in a plane between an upper overhang and lower stepwell which extend outwardly of the vehicle side wall. The proximate edges of the outer panels seal to each other at the center of the access port and the distal edge of each is pivoted to a coplanar outer portion of a side panel. Each side panel has an inner planar portion pivotally attached to the vehicle interior and an intermediate portion of arcuate cross-section which runs from the outer portion to the inner portion closely past a respective side wall of the access port and in engagement with a seal. The outer panel is guided by a guide track on the overhang and a door operator pivots each side panel to fold the outer panel toward the side panel and inwardly of the access port.

3 Claims, 4 Drawing Figures

BIFOLD VEHICLE DOOR ASSEMBLY

BACKGROUND OF THE INVENTION

This invention relates to bifold vehicle door assemblies and more particularly to a bifold vehicle door assembly for opening and closing a passenger access port in a non-linear side of a vehicle.

DESCRIPTION OF THE PRIOR ART

In vehicles such as buses with sides of non-linear vertical cross-section, passenger access ports have non-linear side walls. Door assemblies for such access ports must rotate about linear axes, and it is also desirable to minimize passenger boarding time and, if possible, to match the contour of the sides of the bus. Door assemblies found in the prior art include those of the clam shell type which, while matching the contour of the side of the bus in closed position, intrude into the passenger boarding area in open position since they fold inwardly. Curved doors which fold outwardly also match the contour of the side of the bus in closed position but again intrude into the passenger boarding area in open position. The doors also must of necessity rotate about somewhat complex pantograph type hinges, thus potentially slowing boarding time. Conventional double folding doors consisting of four planar panels fit in a recessed discontinuity in the bus side in closed position which is undesirable for aesthetic reasons.

SUMMARY OF THE INVENTION

The present invention solves the problems inherent in the prior art by providing a door assembly including a pair of inwardly folding bifold doors. Each door includes a planar panel attached by a linear hinge to a respective side panel which rotates about another linear hinge inside the vehicle as the planar panel and side panel fold inwardly and outwardly of the access port between open and closed positions.

The upper and lower walls of the access port of the vehicle are respectively defined by an upper overhang and a lower passenger stepwell, each of which extends slightly outwardly of the vehicle in a horizontal direction. The side walls of non-linear section are defined by the vehicle side and extend vertically between the upper and lower walls.

The planar door panels in closed position are located in a vertical plane between the overhang and stepwell slightly outwardly of the vehicle. The planar panels meet at their proximate edges in the closed position and are equipped with conventional seals. A linear guide track on the overhang lies in the vertical plane and receives a guide of each planar door panel. Each planar panel is attached by a first linear hinge at its distal edge to a respective side panel.

Each side panel includes another planar portion disposed in the same vertical plane as a respective planar panel. Each further includes an intermediate arcuate portion of constant cross-section which extends from the outer planar portion closely past a respective side wall of the access port and into the interior of the vehicle. The intermediate arcuate portions permit the planar door panels and outer planar portion of the side panels to be located slightly outboard of the side of the vehicle and thereby avoid a recessed discontinuity. Conventional seals on each side wall of the access port engage each arcuate portion of the side panels when the door assembly is closed. Each intermediate arcuate portion terminates in a planar inner portion which extends longitudinally of the vehicle within the access port and is pivotally attached to the vehicle interior by a second linear hinge. A conventional linear door operator joined between each side panel and the vehicle interior rotates each side panel inwardly and outwardly of the access port about the second linear hinge to respectively unfold and fold each door as each respective planar panel is guided along the guide track.

In the open position, each bifold door is located in an inwardly folded position adjacent a respective side wall with the side panel thereof located inwardly and to one side of the access port and the planar panel located against a respective side wall. This provides maximum passenger boarding and exit area.

A primary feature of this invention is that it provides an improved bifold door assembly for opening and closing a passenger access port in a non-linear vertical cross-section side of a vehicle. Another feature of this invention is that the door assembly includes a pair of bifold doors which each fold inwardly of the access port to open position to provide maximum passenger boarding and exit area. A further feature is that the bifold doors do not result in any substantial discontinuity in the shape of the vehicle side when in closed position.

Thus, the invention provides a combination of outwardly disposed planar panels, inwardly disposed linear hinges, side panels with intermediate arcuate portions and a guide track which allows the door assembly to fold inwardly free of the passenger access port, all without the use of a recessed discontinuity.

BRIEF DESCRIPTION OF THE DRAWINGS

These and other features of the invention will appear from the following description and accompanying drawings in which.

DESCRIPTION OF THE PREFERRED EMBODIMENT

Figure 1:
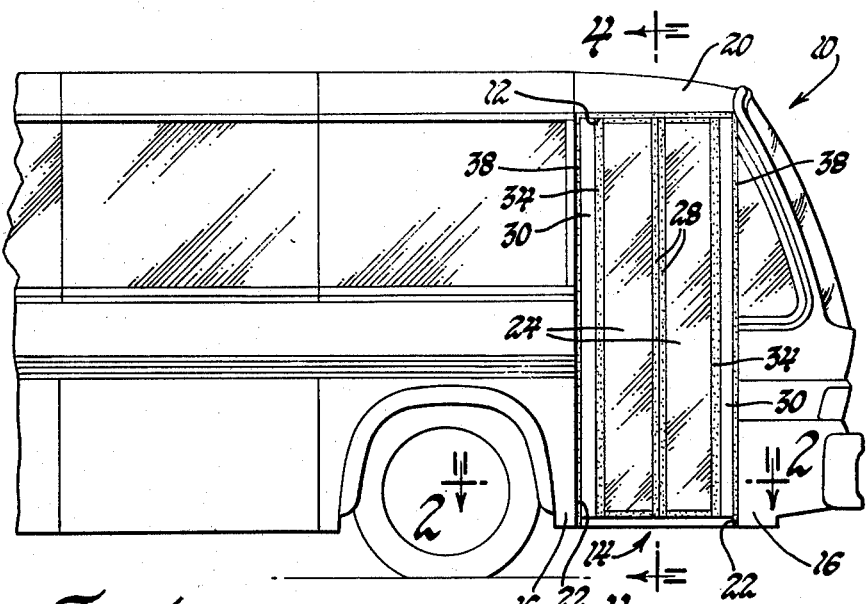
FIG. 1 is a side view of the front portion of a vehicle bus having a bifold door assembly according to this invention for opening and closing the access port in the non-linear side thereof, with the door assembly being shown in closed position.

Referring to the drawings, a vehicle bus designated generally 10 includes a passenger access port 12 opened and closed by a bifold door assembly 14 according to this invention. The body wall or side 16 to each side of access port 12 is of non-linear vertical cross-section as indicated by dash lines in FIG. 4.

Figure 2:
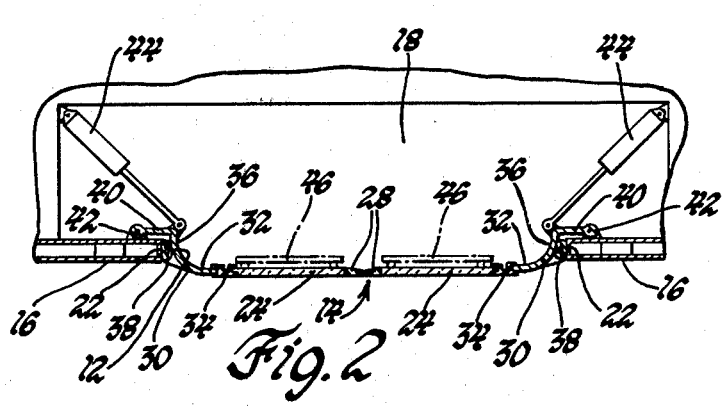
FIG. 2 is an enlarged sectional view taken along the line 2—2 of FIG. 1.
Figure 3:
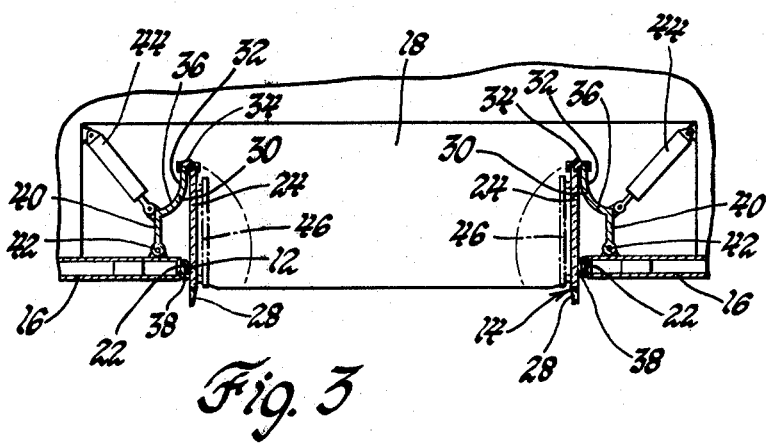
FIG. 3 is a view similar to FIG. 2, showing the door assembly in open position.
Figure 4:
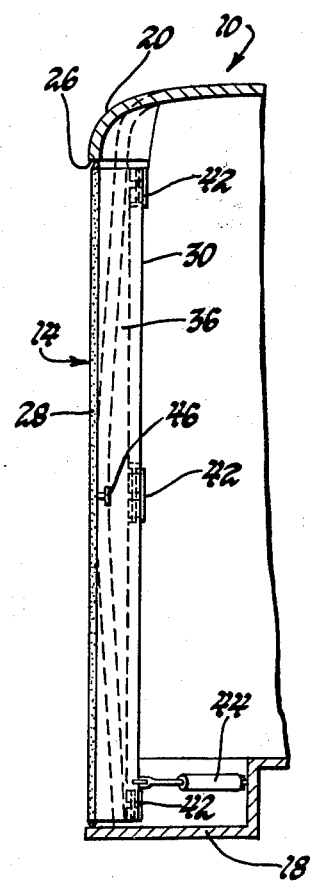
FIG. 4 is a sectional view taken along the line 4—4 of FIG. 1.

Referring to FIGS. 2, 3 and 4, the access port 12 includes a planar lower wall defined by a step well 18 which extends slightly outwardly from the vehicle, and a planar upper wall defined by an overhang 20 which also extends slightly outwardly from the vehicle and is edgewise vertically aligned with the lower wall. The side walls 22 of the access port are defined by the ends of the side 16 of bus 10 and are of generally non-linear vertical section and lie in vertical planes laterally of the bus 10. The bifold door assembly 14 includes a pair of bifold doors. Each door includes an outer planar panel 24 which extends vertically between the upper and lower walls. When the door assembly is in closed position, FIGS. 1 and 2, the panels 24 are disposed in edge-to-edge coplanar relation with each other. A conventional guide track 26 on the outer edge of the upper wall receives a conventional guide pin, not shown, on the upper edge of each panel 24 adjacent the proximate edge thereof. Conventional seals 28 on the proximate edges of the panels 24 sealingly engage in the closed position of the door assembly at the approximate center of the access port 12.

The door assembly 14 further includes a pair of side panels 30 each respective to a planar panel 24 and having an outer planar portion 32 located generally outside a respective side wall 22 and joined at the distal edge thereof to a respective panel 24 by a conventional vertical linear hinge 34, such as a living type hinge. An intermediate arcuate portion 36 of each side panel extends from portion 32 closely past a respective side wall 22 of access port 12, thus matching the outwardly disposed planar panels 24 to the interior of the vehicle without recessed discontinuity. Each side wall 22 mounts a conventional compression type linear seal 38 which engages the arcuate portion 36 when the door assembly is in closed position. The arcuate portion 36 merges into a planar inner portion 40 which is vertically disposed inside the bus side 16 and spaced from side wall 22. Three vertically aligned conventional hinges 42, FIG. 4, mount the portion 40 to the interior of the bus side 16 to mount each bifold door on the bus 10.

The operation of the bifold door assembly 14 may be understood by referring to FIGS. 2 and 3. Conventional hydraulic or air cylinder door operators 44 are pivotally attached between step well 18 and the juncture of portions 36 and 40 of each side panel 30. When it is desired to open the door assembly 14, the door operators 44 are retracted. This rotates each side panel 30 inwardly of access port 12 about hinges 42 to fold each bifold door inwardly of the access port as the outer panel 24 rotates about hinge 34 relative to the side panel and is guided toward a side wall of the access port by the guide track 26. In the fully open position shown in FIG. 3, each side panel 30 is located inwardly of access port 12 and longitudinally to one side of a respective side wall 22. Each outer panel 24 is located against a seal 38 generally within the access port and intrudes only to a minimum within the passenger boarding space. Handles 46 on the inside of panels 24 serve to aid boarding or exiting passengers. It is believed that movement of door assembly 14 from the open position of FIG. 3 to the closed position of FIG. 2 is apparent without further description.

Thus this invention provides a bifold door assembly for opening and closing a passenger access port of a vehicle having a non-linear body side wall.

The embodiments of the invention in which an exclusive property or privilege is claimed are defined as follows:

1. In a vehicle having a body side of non-linear cross-section and a passenger access port having upper and lower walls defined by the vehicle and side walls defined by the body side, a door assembly for opening and closing the access port, comprising, a pair of bifold doors movable between an unfolded position closing the access port and a folded position opening the access port, each door in unfolded position having an outer planar panel disposed between the upper and lower walls, each door further having a side panel having an outer planar portion located generally coplanar to a respective outer panel, an inner portion located inwardly of the body side and an intermediate arcuate portion extending between the inner and outer portions past a respective side wall, first hinge means interconnecting each planar panel and the outer planar portion of a respective side panel, second hinge means interconnecting the inner portion of each side panel and the vehicle to mount each bifold door on the vehicle, means rotating the side panels about the second hinge means to move each door between the unfolded position and a folded position wherein the side panels are located inwardly of the side walls to one side thereof and the outer panels are folded inwardly of the access port and are located adjacent the side walls and the side panels, and cooperating means on each outer panel and one of the upper and lower walls for guiding movement of the planar panels as the bifold doors move between unfolded and folded positions.

2. In a vehicle with a body side of non-linear cross-section and having a passenger access port having upper and lower walls defined by the vehicle and non-linear side walls defined by the body side, a door assembly for opening and closing the access port, comprising, an overhang structure defining the upper wall of the access port and extending outwardly of the side of the vehicle, a stepwell structure defining the lower wall of the vehicle and extending outwardly of the side of the vehicle, a guide track on one such structure, a pair of bifold doors movable between an unfolded position closing the access port and a folded position opening the access port, each bifold door having an outer planar panel disposed, in the unfolded position, in a plane outside the vehicle between the overhang and stepwell structures, each door further having a side panel with an outer planar portion located generally coplanar to a respective outer panel, an inner portion located inwardly of the vehicle body side, and an intermediate arcuate portion extending between the inner and outer portions past a respective side wall of the access port, first hinge means foldably interconnecting the panels of each door, second hinge means mounting each side panel on the vehicle to mount the bifold door thereon, means rotating the side panels about the second hinge means to move each door from the unfolded position to a folded position wherein the side panels are located inwardly of the side walls of the access port and to one side thereof and the outer planar panels are folded inwardly of the access port and adjacent the side walls and the side panels, and means on the outer panels cooperating with the guide track to guide movement of the outer panels as each door folds and unfolds.

3. In a vehicle having a body side of non-linear cross-section and a passenger access port having upper and lower walls defined by the vehicle and side walls defined by the body side, a door assembly for opening and closing the access port comprising, a pair of bifold doors movable between an unfolded position closing the access port and a folded position opening the access port, each door in the unfolded position having an outer planar panel disposed between the upper and lower walls, each door further having a side panel with an outer planar portion located generally coplanar with a respective outer panel, an inner portion located inwardly of the body side and an intermediate arcuate portion of constant cross-section extending between the inner and outer portions past a respective side wall of the access port, sealing means operative between the intermediate arcuate portions and the respective side walls of the access port to seal the space therebetween, first hinge means interconnecting each planar panel and the outer planar portion of a respective side panel, second hinge means interconnecting the inner portion of each side panel and the vehicle to mount each bifold door on the vehicle, means rotating the side panels about the second hinge means to move each door between the unfolded position and a folded position wherein the side panels are located inwardly of the side walls of the access port and to one side thereof and the outer panels are folded inwardly of the access port and adjacent the side walls and the side panels, and cooperating means on each outer panel and one of the upper and lower walls for guiding movement of the outer planar panels as the bifold doors move between the unfolded and folded positions.

* * * * *